United States Patent [19]
Rostoker et al.

[11] Patent Number: 5,832,279
[45] Date of Patent: Nov. 3, 1998

[54] ADVANCED PROGRAMMABLE INTERRUPT CONTROLLER (APIC) WITH HIGH SPEED SERIAL DATA BUS

[75] Inventors: Michael D. Rostoker, Boulder Creek, Calif.; Sushant Verman, Mississauga, Canada; Richard Egan, San Carlos; Jerry Chow, Sunnyvale, both of Calif.

[73] Assignee: LSI Logic Corporation, Milpitas, Calif.

[21] Appl. No.: 863,373

[22] Filed: May 27, 1997

Related U.S. Application Data

[63] Continuation of Ser. No. 485,528, Jun. 7, 1995, abandoned.
[51] Int. Cl.$^6$ ........................................................ G06F 9/46
[52] U.S. Cl. ................................................ 395/739; 395/741
[58] Field of Search ....................................... 395/733–742

[56] References Cited

U.S. PATENT DOCUMENTS

| | | | |
|---|---|---|---|
| 4,992,981 | 2/1991 | Ganssloser et al. | 365/154 |
| 5,260,608 | 11/1993 | Marbot | 307/262 |
| 5,268,937 | 12/1993 | Marbot | 375/121 |
| 5,511,200 | 4/1996 | Jayakumar | 395/739 |
| 5,651,137 | 7/1997 | MacWilliams et al. | 395/468 |
| 5,669,003 | 9/1997 | Carmean et al. | 395/750.04 |

OTHER PUBLICATIONS

* LSI Logic, SeriaLink™ SL300 High–Speed Serializer/Deserializer Technical Manual, May 1995.

*Primary Examiner*—Ayaz R. Sheikh
*Assistant Examiner*—Jigar Pancholi
*Attorney, Agent, or Firm*—Oppenheimer Wolfe & Donnelly LLP

[57] ABSTRACT

A high speed Advanced Programmable Interrupt Controller (APIC) system includes a plurality of local units for prioritizing and passing interrupts, an Input/Output (I/O) unit for feeding interrupts to the local units, and a serial link data transmission system for interconnecting the I/O unit and the local units. The I/O unit and each local unit have a parallel I/O interface. The serial link transmission system includes a parallel signal bus connected to the parallel I/O interface of the I/O unit; a plurality of first serial link transceivers having parallel I/O interfaces connected to the parallel signal bus, and serial I/O interfaces respectively; a plurality of second serial link transceivers having parallel I/O interfaces connected to the parallel I/O interfaces of the local units, and serial I/O interfaces respectively; and a plurality of serial transmission lines interconnecting the serial I/O interfaces of first serial link transceivers and the serial I/O interfaces of second serial link transceivers respectively.

10 Claims, 3 Drawing Sheets

ADVANCED PROGRAMMABLE INTERRUPT CONTROLLER (APIC) WITH HIGH SPEED SERIAL DATA BUS

RELATED APPLICATIONS

This application is a continuation of U.S. patent application Ser. No. 08/485,528 filed Jun. 7, 1995 now abandoned.

BACKGROUND OF THE INVENTION

1. Field of the Invention

The present invention generally relates to the art of very large integrated circuits, and more specifically to An Advanced Programmable Interrupt Controller (APIC) with a high speed serial data bus.

2. Description of the Related Art

Semiconductor devices such as integrated circuits have revolutionized the field of electronics by making possible a level of technological sophistication unknown in the days of vacuum tubes and even discrete transistors. An Integrated circuit die may comprise, on a small silicon chip, many thousand or even a million or more transistors interconnected together to form complex electronic functions. The complex electronic functions of the integrated circuit chip may require hundreds of external connections to a related electronic system.

Increases in electronic system performance, and the requirement to run complex computer software programs with a corresponding increase in memory requirements, have dramatically increased the data throughput or "bandwidth" requirements of, for example, a computer system's memory and especially logic functions. At the same time, improvements in silicon integrated circuit technology have made it possible to integrate more and more logic functions onto a single integrated circuit chip. The advancements in technology and the corresponding utilization thereof have created the need for integrated circuit packages having Input/Output (I/O) capacity requirements of over 500 external connections.

Simple function integrated circuits have been packaged in ceramic packages for high reliability industrial and military applications and in lower cost molded plastic packages for commercial and consumer products. Recently, Very Large Scale Integration (VLSI), Ultra Large Scale Integration (ULSI), and the like Integrated Circuits (IC) have outgrown the connection capacity of traditional ceramic or molded plastic packaging systems because of the large number of external connections required.

The IC packaging industry has therefore developed more sophisticated IC packages to accommodate the increased number of external connections required to be made to the associated electronic system. These IC packages, however, are expensive, difficult to fabricate, may require expensive sockets and take up a lot of valuable electronic system circuit board area. In addition, IC packaging technology has not been able to keep up with the rapidly increasing complexity and sophistication of integrated circuit technologies.

This lag in IC packaging technology has limited the ability of the electronic circuit designer to utilize the full capabilities of present and future IC technologies in an easy to implement and cost effective way.

Another problem with IC packaging is the close proximity in spacing of signal connections that carry parallel data signals. Typically, parallel data signals may be digital words having 32, 64, 128 or more bits, and be connected to a parallel data bus having an equal number of conductive lands or wires such as a computer back plane or the like. The close proximity of many parallel signals having to drive a capacitive bus that may not be impedance matched creates signal crosstalk.

Signal crosstalk further restricts the effective data rate and number of digital devices that may be effectively interconnected in an electronic system.

Yet another problem is connecting these parallel high bit capacity buses to the IC packages and then routing the physically wide parallel buses between the various IC packages on the electronic system substrate or printed circuit board. Sockets for the IC packages and connectors for peripheral printed circuit boards are expensive because of the large number of connections required.

Similarly, leaded IC packages such as, for example, Tape Quad Flat Pack (TQFP), Plastic Quad Flat Pack (PQFP), and Ball Grid Array (BGA) packages require expensive equipment and complex procedures to accurately align the leads/balls on the substrate or board conductive land pattern.

As used herein, the term "semiconductor device" refers to a silicon chip or die containing electronic circuitry and is more commonly referred to as a "semiconductor integrated circuit" or "integrated circuit." The term "semiconductor device assembly" or "integrated circuit assembly" refers to the silicon die and associated packaging containing the die, including conductive leads, such as ball bump, pins, surface mount gull wing and J leads, conductive tabs or balls at the periphery of a package and/or on the interior of a surface or the like, for connecting to a system circuit board, and internal connections of the die to the conductive leads such as bond wires, flip-chip or Tape Automated Bonding (TAB).

The term "semiconductor device assembly" or "integrated circuit assembly" may also refer to the silicon die and associated leadframe such as a tape carrier or package-less silicon die on a leadframe which may be encapsulated or not. The leadframe is connected to the package-less silicon die as is well known to those skilled in the art of semiconductor devices.

What is needed is a method and system for reducing the required number of input-output pins necessary for communicating between complex integrated circuits that require high data throughput and are contained in simple and inexpensive integrated circuit assemblies.

An interrupt is a signal which causes a processor to suspend its current operation in an orderly manner, and initiate another operation designated by an associated interrupt vector which constitutes a starting address for stored program code which controls the processor to perform the operation designated by the interrupt vector.

If several processors are capable of servicing an interrupt, and no specific processor is designated, some method of assigning a processor to service the interrupt is required. Typically, an auxiliary processor is provided for the sole purpose of processing, prioritizing and distributing interrupts, thereby introducing delays into the overall operation of the system. If the interrupts cannot be processed fast enough, data overrun, data loss, and/or system malfunction can occur.

An Advanced Programmable Interrupt Controller (APIC) system or equivalent would overcome this problem. An APIC system comprises a plurality of local units for prioritizing and passing interrupts to processors or other devices, and an Input/Output (I/O) unit for feeding interrupts to processors to which the interrupts are addressed.

Since the APIC system processes interrupts in parallel with the data processing operations, data overrun, data loss, and/or similar system malfunction will not occur. Interrupts are prioritized and distributed in a highly efficient manner compared to the prior art.

In a conventional APIC system, the I/O unit is connected to the local units by a parallel Interrupt Controller Communications (ICC) bus, which is typically a five wire synchronous bus consisting of four wires that are used for data transmission and arbitration, and one wire that is used to transmit clock signals. Attempts to increase the operating speed of the system and thereby reduce the time required for servicing interrupts by increasing the clock frequency result in signal quality and clock skew problems that have remained unsolved.

SUMMARY OF THE INVENTION

In accordance with the present invention, an electronic system such as a Single-Chip-Module (SCM), a Multi-Chip-Module (MCM), or a Board-Level-Product (BLP) includes a plurality of units which are interconnected by a terminated transmission bus line.

At least one of the units includes a high speed Advanced Programmable Interrupt Controller (APIC) system comprises a plurality of local units for prioritizing and passing interrupts, an Input/Output (I/O) unit for feeding interrupts to the local units, and a serial link data transmission system for interconnecting the I/O unit and the local units.

The I/O unit has a parallel I/O interface, and each local unit has a parallel I/O interface. The serial link transmission system comprises a parallel signal bus connected to the parallel I/O interface of the I/O unit; a plurality of first serial link transceivers having parallel I/O interfaces connected to the parallel signal bus, and serial I/O interfaces respectively; a plurality of second serial link transceivers having parallel I/O interfaces connected to the parallel I/O interfaces of the local units, and serial I/O interfaces respectively; and one or more serial transmission lines interconnecting the serial I/O interfaces of first serial link transceivers and the serial I/O interfaces of second serial link transceivers respectively.

A feature of the present invention is the simplicity in which the I/O unit is connected (bused) to a plurality of local units. The serial link transmission system of the present invention multiplexes and serially transmits the interrupt signals of the APIC system so that a smaller number of interconnections are needed for transmission thereof.

The multiplexed signals, according to an aspect of the present invention, may be serially transmitted at a very high data rate, for example, greater than one GigaHertz. This very high multiplexed data rate has sufficient information bandwidth to handle the many interrupt signals presently implemented in digital electronic data processing systems with capability for future demands.

Where a higher data throughput is desired, the present invention is easily scalable up to higher data throughputs required by utilizing faster serial links and/or multiple serial links. Each serial link is capable of data rates of, for example, greater than one Gigabit Per Second (GBS). It is also a feature of the present invention that the serial link may be run at a slower data rate and "speeded up" for future applications by increasing the data transfer rate of the serial link by hardware and/or software control.

An APIC local unit can be integrated with a serial link transceiver on a single integrated circuit chip. An APIC I/O unit can also be integrated with one or more serial link transceiver(s) on a single integrated circuit chip.

In this aspect of the invention, the system cost is reduced through lower chip count, and the chip cost is reduced due to lower pin count. The APIC local units can interface directly to industry standard processors and serial link transceivers such that standard operation system software can be used with minimal modification.

In addition, power consumption is reduced due to a higher level of circuit integration, and the APIC interrupt bus can be scaled up to service more processors without modification.

These and other features and advantages of the present invention will be apparent to those skilled in the art from the following detailed description, taken together with the accompanying drawings, in which like reference numerals refer to like parts.

DETAILED DESCRIPTION OF THE INVENTION

A system level device according to the present invention may specifically include Single-Chip-Modules (SCM), often including other electrical components (such as capacitors); Multi-Chip-Modules (MCM) having 2 or more integrated circuits with or without other electrical components; and board level products (BLP), such as those having multiple integrated circuits on a resin printed circuit or substrate board.

The invention further includes box level products ("Boxes"), which may include a combination of elements from the list of SCM, MCM, BLP, or other devices, and may also include a power supply.

Such system level devices specifically contemplated include digital (or other) memory storage systems, security systems, general purpose computers (such as personal computers, work stations, servers, mini computers, mainframe computers and super computers), transportation vehicles (such as airplanes, trains, automobiles, helicopters, rockets, missiles, boats, and submarines.

The contemplated system level devices further include subsystems for such vehicles, such as positioning (i.e. Global Positioning Systems (GPS)), display controllers, navigation, etc., entertainment systems (such as digital or other television, cameras, recorders, compact disc players/recorders, FM, AM, tape or other audio systems), communication systems such as "traditional" or cellular telephones, PBX, telephone switches, network controllers or encoder/decoders (i.e. token ring, Ethernet, etc.).

The contemplated devices yet further include subsystems or subassemblies for inclusion or attachment to such more complex system level products.

Figure 1:
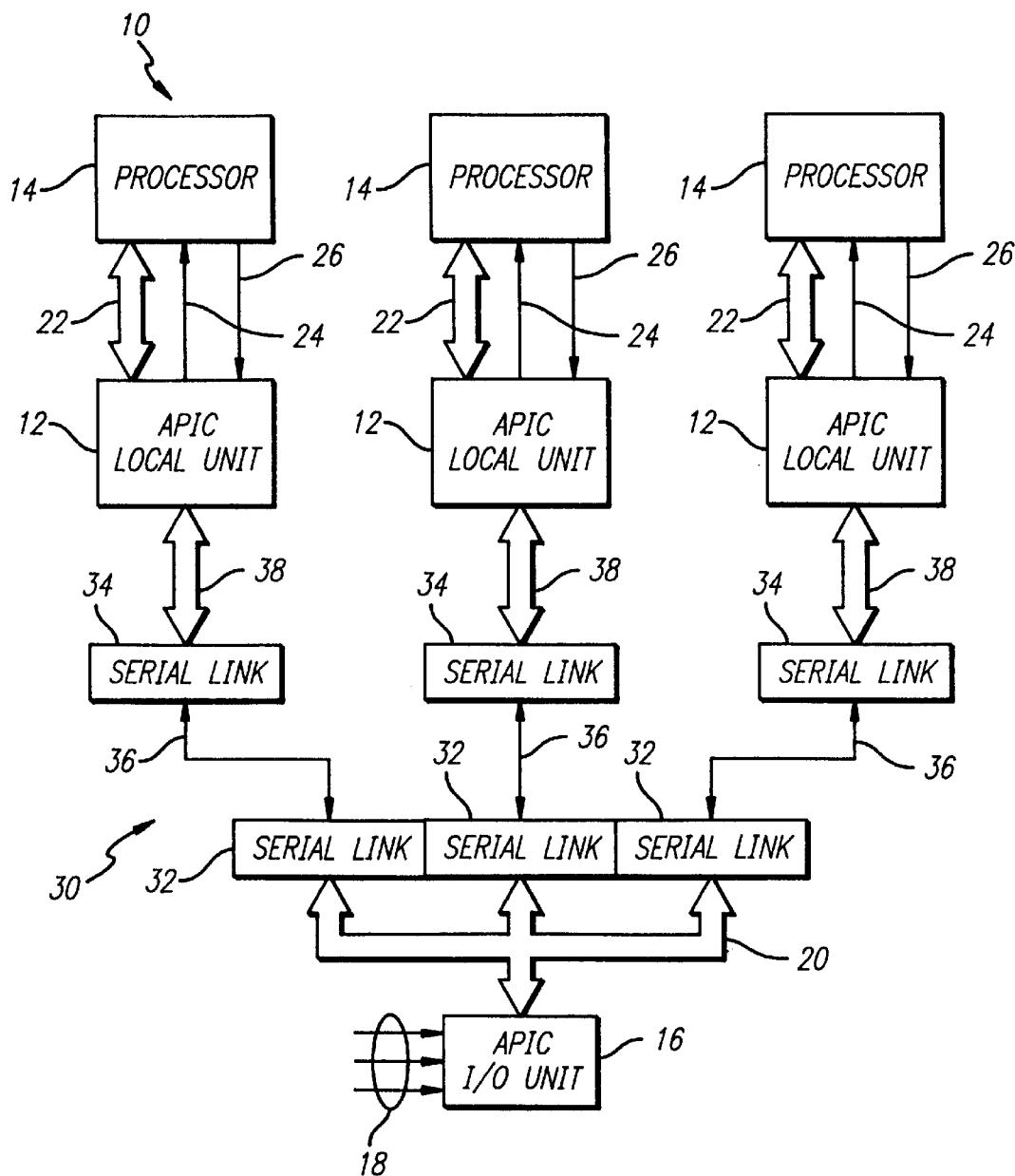
FIG. 1 is a diagram illustrating an Advanced Programmable Interrupt Controller (APIC) system according to the present invention.

As illustrated in FIG. 1, an Advanced Programmable Interrupt Controller (APIC) system 10 according to the present invention comprises three APIC local units 12, which are connected to three processors 14 respectively, and an APIC Input/Output (I/O) unit 16. The processors 14 can be conventional microprocessors, or any other type of electronic devices which are capable of servicing interrupt signals. The processors 14 can be identical, or can be different.

The APIC system 10 efficiently distributes and prioritizes interrupts to the processors 14. In the illustrated arrangement, interrupt signals are received at interrupt signal input lines 18 of the I/O unit 16. There are typically 16 interrupt lines 18 which can be connected to one or more interrupt signal sources in any combination.

The I/O unit 16 receives and applies interrupt signals via a parallel ICC bus 20 to the local units 16. Typically, the ICC bus 20 is a five wire synchronous bus consisting of four wires which are used for data transmission and arbitration, and one wire which is used to transmit clock signals.

Each local unit 12 is connected through a parallel data/address bus 22 to a respective processor 14. The local units 12 and processors 14 are further interconnected by interrupt lines 24 by which the local units 12 can interrupt the processors 14, and interrupt lines 26 by which the processors 14 can interrupt the local units 12.

APIC systems are known in the art per se, and a known APIC system can be combined with a plurality of processors 14 and the substrate structure 12 to implement the present system 10. For example, an ADVANCED PROGRAMMABLE INTERRUPT CONTROLLER 82489DX is commercially available from Intel which includes an I/O unit and a local unit on a single chip.

In a conventional APIC system, the I/O unit 16 is connected directly to the local units 12 by the ICC bus 20. However, the operating speed of the system cannot be increased by increasing the clock frequency, because this results in signal quality and clock skew problems which have remained unsolved.

In order to substantially increase the speed at which signals are transmitted between the I/O unit 16 and the local units 12, and thereby the operating speed of the system 10, a serial link data transmission system 30 is provided for interconnecting these units.

More specifically, three serial link first transceivers 32 have parallel I/O interfaces which are connected to the ICC bus 20, and serial I/O interfaces which are connected to serial signal lines 36. In addition, three second serial link transceivers 34 have parallel I/O interfaces which are connected to parallel ICC bus interfaces of the local units 12 by parallel busses 38, and serial I/O interfaces which are connected to the serial signal lines 36.

Parallel signal data appearing on the ICC bus 20 is converted into serial form by the transceivers 32 and transmitted over the lines 36 to the transceivers 34, which convert the serial data into parallel form and apply it to the local units 12 via the parallel busses 38.

Figure 2:
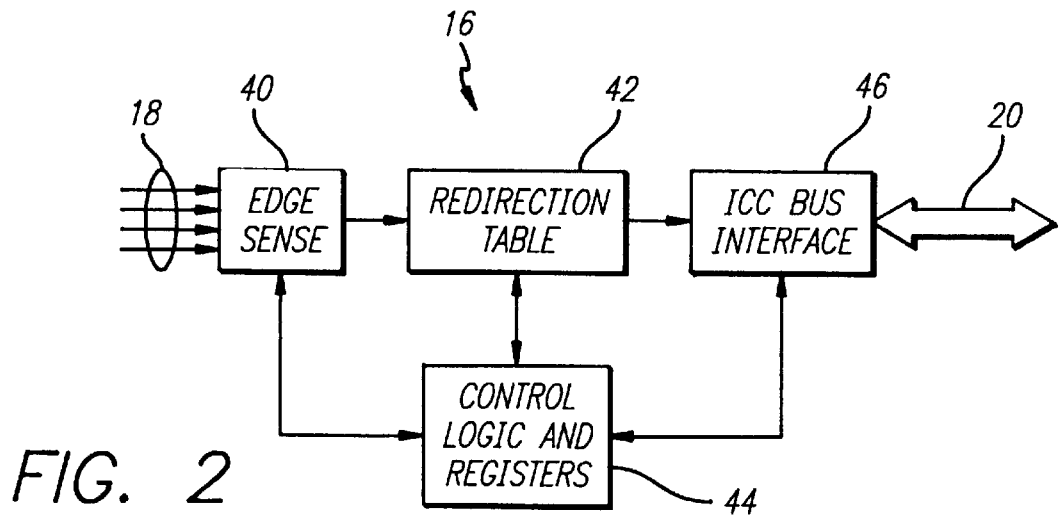
FIG. 2 is a block diagram illustrating the main functional units of an Input/Output (I/O) unit of the present APIC system.

The I/O unit 16 of the APIC system 10 is illustrated in FIG. 2. The unit 16 comprises an edge sense unit 40 which senses interrupts applied to the interrupt lines 18 in the form of an edge or a level. The unit 16 further comprises a redirection table 42 for the interrupts applied to the lines 18. Each entry in the redirection table 42 can be individually programmed to indicate which vector and also what priority the interrupt has, and which of the processors 14 should service the interrupt.

The logic circuitry and storage registers for implementing the functionality of the I/O unit 16 are collectively designated as a control logic and register unit 44. The unit 44 selects the entry in the redirection table 42 corresponding to a received interrupt and uses the information in the entry to format an interrupt request message. An interface unit 46 broadcasts the message to all of the local units 12 via the ICC bus 20.

Figure 3:
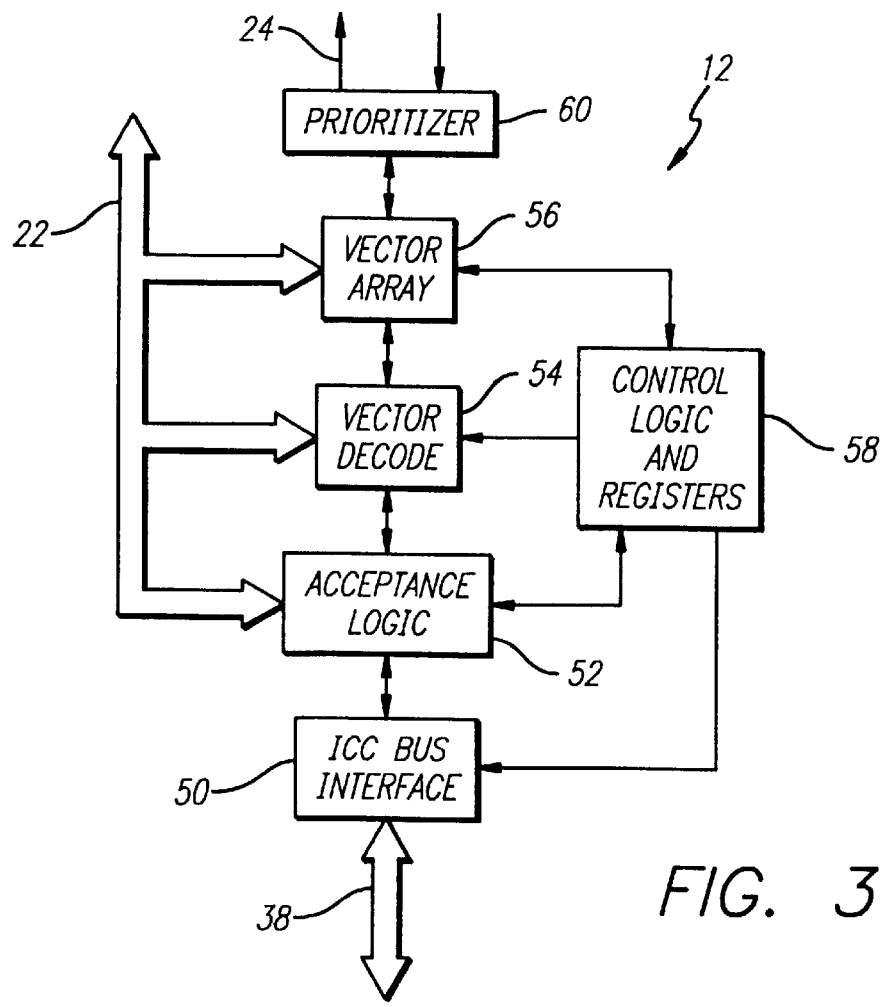
FIG. 3 is a block diagram illustrating the main functional units of a local unit of the APIC system.

Each local unit 12 as illustrated in FIG. 3 has the necessary logical functionality for determining whether or not the respective processor 14 should accept interrupt messages received over the bus 38 from the I/O unit 16 and/or other local units 12. Each local unit 12 also provides local pending of interrupts, nesting and masking of interrupts, and handles all transactions with the respective processor 14.

Interrupt request messages received from the parallel bus 38 via a parallel ICC bus interface 50 (which is connected directly to the ICC bus 20 in a conventional APIC system) are applied to an acceptance logic unit 52. Each interrupt message includes a vector indicating to which processor 14 the interrupt is addressed. It will be noted that a particular interrupt can be serviced by more than one processor 14 on a prioritized basis, and that a particular vector can designate more than one processor 14.

A vector decode unit 54 decodes the vector in the interrupt message by referring to a vector array 56. Under control of a control logic and register unit 58, the local unit 12 determines whether or not the interrupt is addressed to the respective processor 14 and, if so, prioritizes the interrupt message and applies an interrupt to the respective processor 14 via a prioritizer unit 60 and the interrupt line 24.

The local unit 12 also applies an associated interrupt vector to the processor 14 over the data/address bus 22. This vector constitutes a starting address for stored program code which controls the processor 14 to perform the operation designated by the interrupt vector. In response to the interrupt on the line 24, the processor 14 suspends its current operation in a timely manner and services the interrupt.

Since the APIC system processes interrupts in parallel with the data processing operations, data overrun, data loss, and/or system malfunction will not occur. Interrupts are prioritized and distributed in a highly efficient manner compared to the prior art.

The serial link system 30 transmits and receives digital information and control signals over the serial digital communications lines 36 that may be, for example, coaxial cable, twisted pair, glass fiber optic light conduit, wireless such as cellular, VHF and UHF radio, microwave or focused infrared.

The present invention eliminates the need for complex multi-wire digital buses presently needed to interconnect high speed digital information between the I/O unit 16 and the local units 12. The heretofore parallel data buses have created the requirement for high pin count packages in order to transmit in parallel (simultaneous data transmission) the digital information. In addition, routing of these parallel data buses on a system printed circuit board is difficult and requires a significant amount of circuit board area.

According to this aspect of the invention, serial high speed interconnect devices may be implemented from any number of existing technologies that are being presently utilized for sending and receiving high speed digital computer data. Typical digital protocols are well known to those skilled in the art of digital communication systems as may be utilized for data modems, Local Area Networks (LAN), Wide Area Networks (WAN), and the like (both "wired" and "wireless" configurations).

An illustrative serial transmission technology is disclosed in U.S. Pat. No. 5,268,937, entitled METHOD AND SYSTEM FOR DIGITAL TRANSMISSION OF SERIAL DATA, issued Dec. 7, 1993, by Roland Marbot; and U.S. Pat. No. 5,260,608, entitled PHASE-LOCKED LOOP AND RESULTING FREQUENCY MULTIPLIER, issued Nov. 9, 1993, by Roland Marbot; both incorporated by reference herein for all purposes (the Marbot Patents).

The Marbot Patents teach a method and system for digital data transmission that also includes a means of creating all necessary clock and synchronization information for the data so as to constitute the transmission signal and determine the transmission speed, clock rate, and synchronization lock from the received transmission signal.

The circuits disclosed in the Marbot Patents may be integrated onto a semiconductor device or on another semiconductor device proximate to the IC device in the same semiconductor device assembly. Use of serial transmission and reception digital logic circuits requiring no analog phase lock loop subsystems helps make the present invention economically practical. In addition, a minimum of digital protocol overhead is required and digital communication between the various semiconductor devices is rapid and reliable.

Implementation of the circuits of the Marbot Patents, and other similar types of circuits, in the present invention is well known to those skilled in the art of digital communications systems and integrated circuit design. Integrated circuits utilizing the Marbot Patents or similar technologies are conventionally designed and preferably may be combined with the other elements of the present APIC system 10.

Preferably, a serial digital transmission technology that may be utilized is SeriaLink™ (SERIALINK is a trademark of LSI Logic Corporation) circuits. The SERIALINK technology is owned by LSI Logic Corporation. This SERIALINK technology is more fully described in "SeriaLink SL300 High-Speed Serializer/Deserializer Technical Manual," LSI Logic Document DBO4-000042-00, First Edition.

Both the Marbot Patents and SERIALINK technologies may be used to implement the serial link transceivers 32 and 34 as Serial High Speed Interconnect Devices (SHSID). The SHSID may be utilized with any number of data transmission protocols such as, for example, the Scalable Coherent Interface (SCI), ANSI/IEEE Std 1596-1992 SCI, Asynchronous Transfer Mode (ATM), Fiber Channel, SerialBus, SCSI, SSA, QuickRing, HIPPI, FDDI, Ethernet and other present or future serial digital protocols. Many other alternative serial high-speed interconnection technologies may be used and are contemplated herein.

A feature of the present invention is the simplicity in which the I/O unit 16 is connected (bused) to the local units 12. The serial link transmission system 30 of the present invention multiplexes and serially transmits the interrupt signals so that a smaller number of interconnections are needed for transmission thereof.

The multiplexed interrupt signals, according to an aspect of the present invention, may be serially transmitted at a very high data rate, for example, greater than one GigaHertz. This very high multiplexed data rate has sufficient information bandwidth to handle the majority of interrupt applications presently implemented in digital electronic systems. Where a higher data throughput is desired, the present invention is easily scalable up to the higher data throughput required by utilizing multiple serial links.

Each serial link is capable of data rates of, for example, greater than one Gigabit Per Second (GBS). It is also a feature of the present invention that the serial link transmission system 30 may be run at a slower data rate and "speeded up" for future applications by increasing the data transfer rate of the serial link by hardware and/or software control.

Physical serial link interconnections between the semiconductor devices may be made with constant impedance strip line, coaxial cable, twisted wire pair or the like. The semiconductor devices may be on one substrate or printed circuit board or on a plurality of printed circuit boards.

Alternatively, wireless interconnections may be accomplished between the semiconductor devices by using microwave, focused infrared, spread spectrum or other wireless data transmission systems.

Combinations of both wired and wireless connections are also contemplated. It is the intent of the present invention that cables, wires, twisted pairs and the like also include non-physical, i.e., wireless connections as is well known to those skilled in the art. The wireless communications medium may also be part of the semiconductor device assembly or fabricated onto the semiconductor integrated circuit.

Another feature of the present invention is implementation of at least one high speed serial link transceiver 32 or 34 with an APIC I/O unit 16 or local unit 12 in a single semiconductor integrated circuit chip module. This serial link may initially remain dormant and not utilized until it is required in the electronic system. By implementing the serial link into each integrated circuit, the electrical designer may choose to interconnect but not utilize the high speed data serial link until required in the system, i.e., future system upgrade or expansion.

Having the serial link(s) remain dormant until needed allows using ICs in existing parallel bus systems and then being able to easily upgrade system performance by simply enabling the serial link(s) which already exist in the ICs of the present invention. Thus, existing equipment designs need not be made obsolete.

In addition, new designs utilizing the serial link(s) of the present invention may be integrated into normal product design updates and will be ready for full implementation of the serial link(s) when appropriate. This also facilitates reduction in manufacturing costs by allowing the use of lower cost IC packages and interconnecting these reduced cost IC packages with serial link(s) of the present invention.

The selection, combination and interplay between the devices of the APIC system 10 and their relative locations is greatly expanded because, with the present invention, the designer is not required to rely on a plurality of individual signal wires in a parallel bus configuration that has to be correctly interconnected between the semiconductor devices. The devices no longer must be in close proximity to one another on the same system printed circuit board, or closely coupled system and daughter boards.

Figure 4:
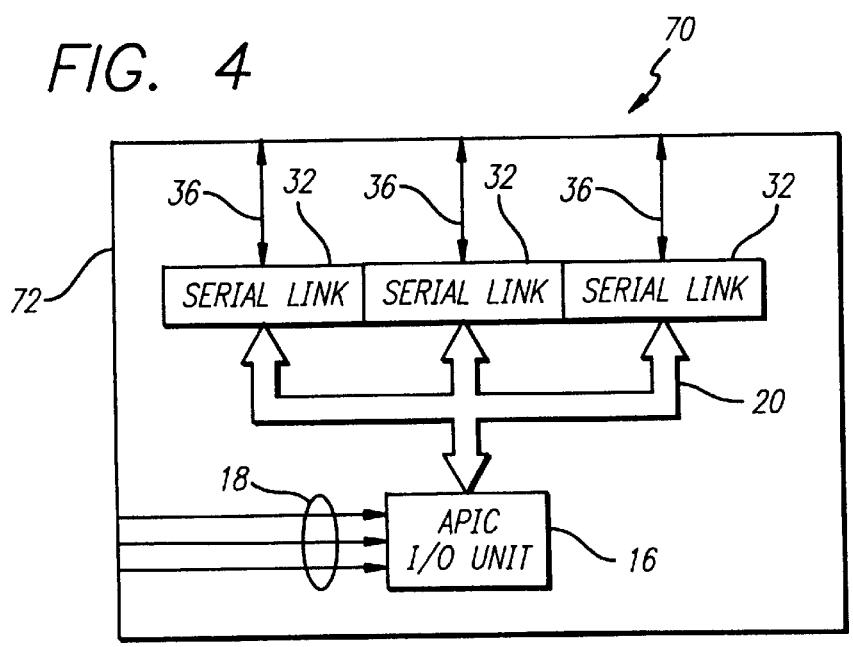
FIG. 4 is a diagram illustrating an APIC I/O unit module of the invention.

FIG. 4 illustrates an APIC module 70 which is formed on an integrated circuit substrate 72. The module 70 comprises an APIC local unit 16, ICC bus 20, a plurality of serial link transceivers 32, and serial signal lines 36 respectively.

Figure 5:
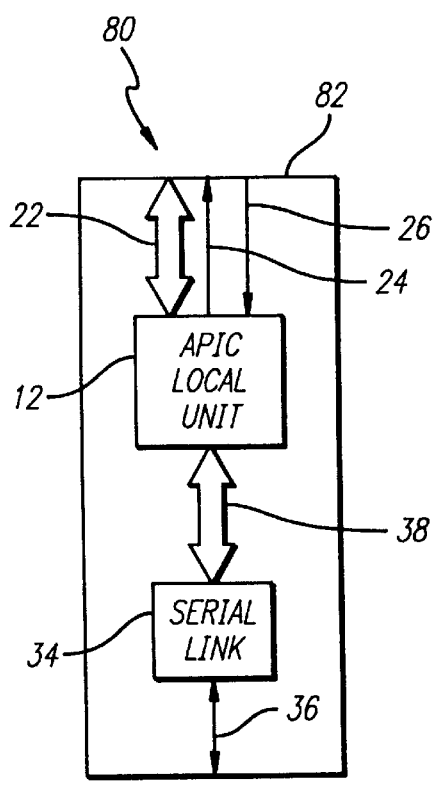
FIG. 5 is a diagram illustrating an APIC local unit module of the invention.

FIG. 5 illustrates an APIC module 80 which is formed on an integrated circuit substrate 82. The module 80 comprises an APIC local unit 12, a serial link transceiver 34, parallel busses 22 and 38, serial transmission line 36 and interrupt lines 24 and 26.

Figure 6:
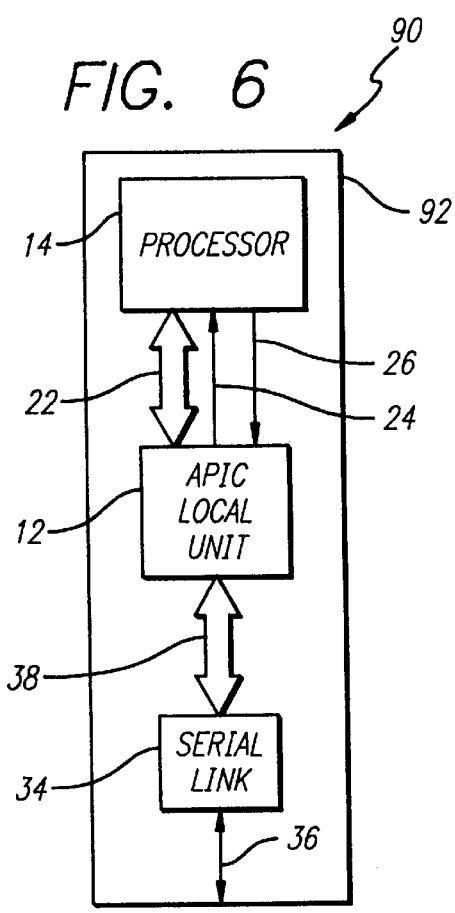
FIG. 6 is a diagram illustrating another APIC local unit module of the invention.

FIG. 6 illustrates an APIC module 90 which is formed on a semiconductor substrate 92. The module 90 is similar to the module 80 but additionally includes a processor 14.

It will be understood that although only one local unit 12, serial link transceiver 324 and processor 14 are illustrated in FIGS. 5 and 6, the invention is not so limited, and any practical number of these devices can be provided on a single integrated circuit chip.

Any of the illustrated embodiments of the invention can be implemented as a system level device including one or more Single-Chip-Modules (SCM), often including other electrical components (such as capacitors); Multi-Chip-Modules (MCM) having 2 or more integrated circuits with or without other electrical components; and board level products (BLP), such as those having multiple integrated circuits on a resin printed circuit or substrate board.

The invention can be further embodied as including one or more box level products ("Boxes"), which may include a combination of elements from the list of SCM, MCM, BLP, or other devices, and may also include a power supply.

Off-chip memory access delays and latencies involved in conventional network interconnect devices are eliminated in the modules 70, 80 and 90. Such integration enables the present system to operate at substantially higher speeds than conventional devices. The integrated circuit chip can be easily plugged into a socket in highly divergent types of network and host devices, thereby providing a highly desirable and cost-efficient replacement for conventional large, expensive and inflexible network interconnects and interrupt handling architecture.

The system cost is reduced through lower chip count, and the chip cost is reduced due to lower pin count. The APIC local units can interface directly to industry standard processors such that standard operation system software can be used with minimal modification.

In addition, power consumption is reduced due to a higher level of circuit integration, and the APIC interrupt bus can be scaled up to provide more processors in the system without modification.

Various modifications will become possible for those skilled in the art after receiving the teachings of the present disclosure without departing from the scope thereof.

We claim:

1. A high speed system, including a single input/output advanced programmable interrupt controller for distributing and prioritizing interrupts to a plurality of processor systems, each processor system including a processor with an associated local advanced programmable interrupt controller having a parallel interrupt controller communication bus interface, said interrupt processing system, comprising:
    a first plurality of serial link data transmission systems coupled to the plurality of processor systems for converting serial data into parallel data to facilitate increasing data transmission speeds between the local advanced programmable interrupt controllers and the single input/output advanced programmable interrupt controller; and
    a second plurality of serial link data transmission systems coupled between said first plurality of serial link data transmission systems and the single input/output advanced programmable interrupt controller for converting parallel data into serial data to further facilitate increasing the data transmission speeds between the local advanced programmable interrupt controllers and the single input/output advanced programmable interrupt controller;
    said first plurality and said second plurality of serial link data transmission systems cooperating with the single input/output advanced programmable interrupt controller to enable high speed data transmission from the single input/output advanced programmable interrupt controller and the individual ones of the local advanced programmable interrupt controllers.

2. A high speed interrupt processing system according to claim 1, wherein each individual one of said first plurality of serial link data transmission systems includes:
    a first parallel signal bus coupled to the parallel interrupt controller communication bus interface of an individual one of the local advanced programmable interrupt controllers;
    a first serial signal bus coupled to the serial input/output interface of an individual one of the second plurality of serial link data transmission systems; and
    a first serial link transceiver having a parallel I/O interface coupled to the first parallel signal bus, and a serial I/O interface coupled to the first serial signal bus.

3. A high speed interrupt processing system according to claim 2, further comprising:
    a parallel interrupt controller bus coupled between the single input/output advanced programmable interrupt controller and said second plurality of serial link data transmission system; and
    wherein said single input/output advanced programmable interrupt controller includes:
        at least one interrupt signal input;
        a redirection table responsive to an interrupt signal coupled from said at least one interrupt signal input for specifying an individual one of the local advanced programmable interrupt controllers to which said interrupt signal is directed; and
        an interface unit for sending interrupts to the first parallel signal bus with vectors indicating local controllers to which interrupts are addressed.

4. A high speed interrupt processing system according to claim 3, wherein each local controller includes:
    a vector decoding unit for decoding vectors of interrupts and accepting only interrupts having vectors corresponding thereto.

5. A high speed interrupt processing system according to claim 1, wherein said single input/output advanced programmable interrupt controller includes:
    an interrupt controller communication bus interface coupled to the interrupt controller communication bus;
    a redirection unit coupled to said interrupt controller communication bus interface for passing signals indicative of an addressed one of the local controllers to receive an interrupt for processing purposes; and
    an edge sense unit couple to said redirection circuit for sensing interrupt signals to be prioritized and directed to individual ones of the local controllers by the single controller.

6. A high speed interrupt processing system including a single input/output advanced programmable interrupt controller for distributing and prioritizing interrupts to a plurality of processor systems, each processor system including a processor with an associated local advanced programmable interrupt controller having a parallel interrupt controller communication bus interface, said interrupt processing system, comprising:
    a substrate;
    a first plurality of serial link data transmission systems formed on said substrate and coupled to the plurality of processor systems for converting serial data into parallel data to facilitate increasing data transmission speeds between the local advanced programmable interrupt controllers and the single input/output advanced programmable interrupt controller;

a second plurality of serial link data transmission systems formed on said substrate and coupled between said first plurality of serial link data transmission systems and the single input/output advanced programmable interrupt controller for converting parallel data into serial data to further facilitate increasing the data transmission speeds between the local advanced programmable interrupt controllers and the single input/output advanced programmable interrupt controller;

said first plurality and said second plurality of serial link data transmission systems cooperating with the single input/output advanced programmable interrupt controller to enable high speed data transmission from the single input/output advanced programmable interrupt controller and the individual ones of the local advanced programmable interrupt controllers.

7. A high speed system according to claim 6, wherein each individual one of said first plurality of serial link data transmission systems includes:

a first parallel signal bus coupled to the parallel interrupt controller communication bus interface of an individual one of the local advanced programmable interrupt controllers;

a first serial signal bus coupled to the serial input/output interface of an individual one of the second plurality of serial link data transmission systems; and a first serial link transceiver having a parallel I/O interface coupled to the first parallel signal bus, and a serial I/O interface coupled to the first serial signal bus.

8. A high speed interrupt system according to claim 7, further comprising:

a parallel interrupt controller bus coupled between the single input/output advanced programmable interrupt controller and said second plurality of serial link data transmission system.

9. A high speed interrupt system according to claim 8, wherein said single input/output advanced programmable interrupt controller includes:

at least one interrupt signal input;

a redirection table responsive to an interrupt signal coupled from said at least one interrupt signal input for specifying an individual one of the local advanced programmable interrupt controllers to which said interrupt signal is directed; and an interface unit for sending interrupts to the first parallel signal bus with vectors indicating local controllers to which interrupts are addressed.

10. A high speed interrupt system according to claim 9, wherein each local controller includes:

a vector decoding unit for decoding vectors of interrupts and accepting only interrupts having vectors corresponding thereto.

* * * * *